Patented Apr. 28, 1953

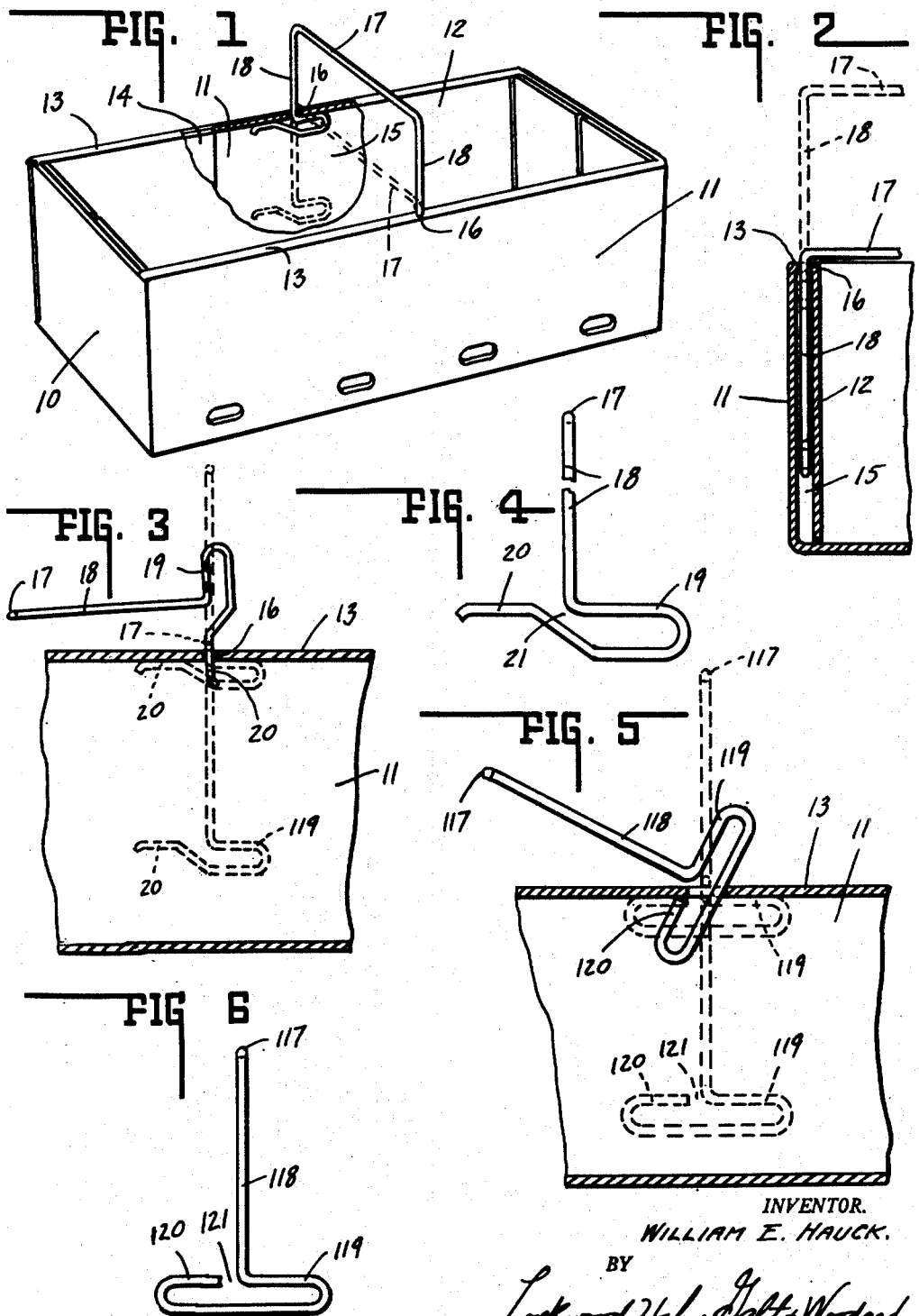

2,636,663

UNITED STATES PATENT OFFICE 2,636,663

WIRE HANDLED BASKET

William E. Hauck, Indianapolis, Ind., assignor to Inland Container Corporation, Indianapolis, Ind., a corporation Application November 10, 1951, Serial No. 255,831

2 Claims. (Cl. 229—52)

This invention relates to wire handled baskets, particularly small corrugated board baskets used for packing and handling of fruits and vegetables. However, the material of which the basket is formed may be of like character such as solid board of combined plys, plywood or any other suitable material.

In this type of basket it is frequently desirable that the basket be packed with the handle removed since at the time of packing, an attached handle extending upwardly from the top of the basket interferes with the rapid packing thereof. Furthermore, it is frequently desirable that the handle be so arranged that it may be conveniently and quickly attached to the basket without tools, stitching machines, stitches or loss of time, and after attachment will remain locked in place against accidental removal. It is further desirable that such handle be arranged so that its upwardly-extending bail portion may be readily moved to and from a position lying flush with the upper walls of the basket so that the baskets can be stacked one upon another, either in parallel or in crosswise relation.

It is therefore the object of this invention to provide a fruit and produce basket of a structure to readily receive and anchor a detachable wire handle and so form the wire handle as to permit it to be readily attached to the basket without cutting or breaking the inner or outer side walls thereof and which will have all of the advantages above more particularly enumerated.

This is accomplished by forming the anchoring ends of the wire handle in inverted T-shape to form locking prongs, but wherein the locking prongs of the handle are bent and looped to permit ready insertion through a small perforation in the double wall rail of the basket without slitting or otherwise deforming either the inner or outer side walls thereof and permit telescopic movement therein between basket carrying and stacking positions; and wherein said handle may be removed through the apertured rail of the basket if desired.

Wherein the usual flat cover board is applied to such a basket, the wire handle structure provides a lock or grip therefor regardless of its position, i. e., whether it is in lowered basket stacking position or in its raised carrying position. The threading feature of the handle also permits its application to the basket after the cover is applied, which has definite advantages, including the embracing of the cover and engagement with inter-connecting side notches, which may be provided therein.

The full nature of the invention will be understood from the accompanying drawings and the following description and claims:

Fig. 1 is a perspective view of a corrugated board fruit and vegetable basket showing the handle in carrying position in full lines and in nesting position in dotted lines.

Fig. 2 is a transverse section through one wall of the basket showing the handle in nested position in full lines and in carrying position in dotted lines.

Fig. 3 is a longitudinal section through the side of the basket with the inner wall removed, illustrating the threading position of the locking prongs of the handle in full lines and their locking and carrying position in dotted lines.

Fig. 4 is a side elevation of one of the locking prongs of Fig. 3.

Fig. 5 is the same as Fig. 3 showing threading of a modified form of the locking prongs.

Fig. 6 is the same as Fig. 4 showing the said modified form of Fig. 5.

In the drawings there is shown a corrugated board fruit and vegetable basket 10 having either full or partly double walls including an outer wall portion 11 and an inner wall portion 12 which may extend fully or partially to the bottom of the basket. The wall portions are joined by a transversely extending portion thereof forming a double wall rail 13. Thus, the inner and outer portions of the wall are slightly spaced apart to receive the lateral locking flaps of the end walls which extend part of the way inwardly and along the side walls, as indicated at 14. This leaves a free open space 15 between the wall portions 11 and 12 extending the full depth of the basket, and into which the locking prongs of the wire handle may freely move from handle-extended position, shown in full lines, to its lowered flush position, shown in dotted lines (Fig. 1). In each of the side wall rails centrally relative to their opposite ends, there is provided a small perforation 16 approximately the diameter of the wire of the handle, through which the locking prongs of the handle are to be threaded.

The wire handle includes a bail portion 17 to extend transversely of the basket and downwardly extending leg portions 18 slidable through the perforations 16. The locking prongs of the handle are formed at the lower end of the leg portions respectively by bending the wire to provide a U-shaped prong portion 19 bent laterally from each leg portion to extend at right angles thereto and to the bail portion. The prong portion 19 has its reversely bent portion extending into an opposed prong portion 20 curved upwardly so that its upper surface lies in a plane with the upper section of the prong portion 19 on the opposite side of the leg portion 18. However, it is to be noted as shown in Fig. 4, that the opposed prong portion 20 is spaced from the portions 18, 19 at 21 in an amount slightly greater than the thickness of the corrugated board rail 13.

As shown in Fig. 3, the removable wire handle is readily positioned and locked in the basket by threading the prong portions 20 downwardly through the apertures 16, and then swinging the bail from its angular position shown in full lines, beyond its upright position, shown in dotted lines, as the lower finger of the U-shaped prong position 19 is pressed inwardly and laterally about the stock of the rails 13 which passes through the space or gap 21 until the upper section of the prong portion 19 is aligned with the aperture.

The legs having been swung beyond the vertical, permit the upper section of the prong portion 19 to slide downwardly through the aperture so that the locking prongs are entirely embraced within the space 15 of the walls. With the bail portion drawn upwardly to its carrying position, the locking prongs, including the upper section of the portion 19 and the portion 20, bear against the under side of the rail 13. The basket is thus suspended in carrying position with the leg portions confined and slidable within the apertures. This permits the handle to be lowered to basket nesting position, as shown in dotted lines of Fig. 1, and full lines of Fig. 2, or be raised to carrying position.

The handle may be removed through the aperture by a reverse operation to that above described, i. e., swinging the handle to position for withdrawing first the upper section of the prong portion 19 through the aperture, and then swinging it to the opposite position to slide the lower section thereof and the portion 20 through the aperture.

In the modified form shown in Figs. 5 and 6, the bail portion of the handle is indicated at 117 and the leg portion at 118. The U-shaped prong portion is indicated at 119, but the opposed prong portion instead of being curved upwardly is likewise U-shaped as indicated at 120, with its upper section extending in the plane of the upper section of the prong portion 119. The end of the portion 120 is spaced from the leg and prong portion 119 to the extent of the space or gap indicated at 121.

In this form of locking prongs the aperture 13 in the wall rail must be slightly elongated to the depth of the U-shaped prong portion 120, whereby said U-shaped prong portion may be threaded through the aperture, as above described with respect to the prong portion 20. Otherwise, the threading and interlocking of the modified prong portion follows the same movement as above described with respect to Fig. 3.

The invention claimed is:

1. The combination with a container having spaced side walls connected by a rail having a perforation therein; of a handle for said container comprising a leg formed of a strand of wire of a diameter to be received in said perforation, the leg bent outwardly near one end thereof at right angles to said leg to provide a prong, then bent downwardly and in a reverse direction in spaced parallelism with said prong to a point adjacent to said leg, then in an upward direction across the plane of said leg and spaced therefrom, and the free end of said portion bent outwardly from said leg to provide a second prong in alignment with said first mentioned prong, whereby both of said prong portions may be inserted through said perforation to lie beneath and parallel with said rail and to bear equally against said rail on opposite sides of said opening when said leg is at right angles to said rail.

2. The combination with a container having spaced sides each having spaced walls connected at their upper ends by a rail having an opening therein, of a handle comprising a bail having single strand wire legs depending therefrom in parallelism and spaced apart a distance substantially equal to the distance between said sides and of a diameter to be received in said openings, the lower portions of each of said legs bent outwardly near one end thereof at right angles to its respective leg to provide a prong, then bent downwardly and in a reverse direction in spaced parallelism with said prong to a point adjacent to said leg, then in an upward direction across the plane of said leg and spaced therefrom, and the free end of said portion bent outwardly from said leg to provide a second prong in alignment with said first mentioned prong, whereby said prongs when inserted through said opening will be disposed beneath said rail and in parallelism therewith on opposite sides of said opening when said leg is perpendicular to said rail.

WILLIAM E. HAUCK.

References Cited in the file of this patent

UNITED STATES PATENTS

| Number | Name | Date |
|---|---|---|
| 2,132,638 | Mohler | Oct. 11, 1938 |
| 2,218,360 | Rokol | Oct. 15, 1940 |
| 2,354,867 | Larkin | Aug. 1, 1944 |
| 2,397,880 | Newman | Apr. 2, 1946 |
| 2,464,337 | Morris | Mar. 15, 1949 |

FOREIGN PATENTS

| Number | Country | Date |
|---|---|---|
| 77,860 | Switzerland | June 1, 1918 |